INVENTOR
CHARLES M. MARTIN
BY C. A. Gulbrandsen
ATTY.

Aug. 22, 1967

C. M. MARTIN 3,337,690

AUTOMATIC TELEPHONE ANSWERING AND MESSAGE RECORDING MACHINE HAVING FIXED CYCLE OF OPERATION AND REMOTE CALL-BACK

Filed July 1, 1963

4 Sheets-Sheet 2

Aug. 22, 1967

C. M. MARTIN 3,337,690

AUTOMATIC TELEPHONE ANSWERING AND MESSAGE RECORDING MACHINE HAVING FIXED CYCLE OF OPERATION AND REMOTE CALL-BACK

Filed July 1, 1963

4 Sheets-Sheet 3

Aug. 22, 1967 C. M. MARTIN 3,337,690

AUTOMATIC TELEPHONE ANSWERING AND MESSAGE RECORDING MACHINE HAVING FIXED CYCLE OF OPERATION AND REMOTE CALL-BACK

Filed July 1, 1963 4 Sheets-Sheet 4

United States Patent Office 3,337,690

Patented Aug. 22, 1967

3,337,690

AUTOMATIC TELEPHONE ANSWERING AND MESSAGE RECORDING MACHINE HAVING FIXED CYCLE OF OPERATION AND REMOTE CALL-BACK

Charles M. Martin, Pewaukee, Wis., assignor to Automatic Electric Laboratories, Inc., Northlake, Ill., a corporation of Delaware Filed July 1, 1963, Ser. No. 292,018
10 Claims. (Cl. 179—6)

ABSTRACT OF THE DISCLOSURE

A machine connected to a telephone line in multiple with a local subscriber station and operated in response to receipt of ringing current over the line on incoming calls thereto for delivering a prerecorded outgoing message from an endless tape and recording incoming messages on a storage tape, wherein the endless tape causes the transmission of a single tone to the calling subscriber as an indication for starting the incoming message and later causes the transmission of a double tone to the calling subscriber as an indication that the incoming message should be terminated. The incoming message recording apparatus is maintained in an operating condition for a predetermined time after operation of the outgoing message apparatus has terminated to receive and record a remote seizure signal from the calling subscriber. Apparatus in the machine is operated in response to receipt of the remote seizure signal for extending an acknowledgement signal back to the calling subscriber and for operating the machine in a rewind function to transfer the incoming message tape from the takeup reel to the supply reel, with a transparent section attached to the end of the incoming message tape operating apparatus to stop further operation of the machine in the rewind function. The machine is thereafter operated in the playback function to play back all the previously recorded incoming messages to the calling subscriber and upon reaching the recorded seizure signal, the machine is momentarily operated thereby in a momentary combined rewind and erase function to erase the recorded marking or remote seizure signal. A very short voice signal may be recorded prior to the recording of the remote seizure signal, with this voice signal informing the calling subscriber that he may reoperate his portable oscillator before playback of the remote seizure signal to cause the machine to transfer from the playback function into a combined rewind erase function for removing all of the messages on the incoming tape and restoring the full recording capacity of the machine.

This invention relates to telephone systems involving the use of automatic telephone answering and message recording devices, or machines, adapted to be connected to a local subscriber's telephone line for the purpose of automatically transmitting and receiving messages over the telephone line during the absence of the local subscriber from his telephone.

Telephone answering and message recording devices, or machines, function during the absence of the local subscriber, or when the telephone is otherwise unattended, to recognize and automatically acknowledge incoming calls to the telephone; to transmit an advisory or informative message to the calling party appraising him of the fact that the called subscriber is not available and that the telephone line is equipped with facilities for recording a message if the calling party cares to transmit one; and to record any message transmitted by the calling party for subsequent reproduction at the local called station or for transmission to a remote calling party.

The main object of this invention is to provide a simplified automatic telephone answering and message recording device that is economical, efficient and reliable in operation, which may be located on the local telephone subscriber's premises, physically apart from the actual telephone instrument.

Another object of this invention is to provide an automatic telephone answering and message recording device, in which subsequent to the initial answer operation by the device in response to receipt of ringing current, the remaining cycle of operations of the device is under control of the outgoing message recording medium during particular selected operating functions.

A further object of this invention is to provide an automatic telephone answering and message recording device in which, after the device is initially operated in response to receipt of ringing current, the subsequent cycle of operations is successively under control of the outgoing message recording medium, the outgoing message medium and a remote calling party, and either the incoming message recording medium or the incoming message medium and a remote calling party, during a different selected operating function.

In known systems of the type to which this invention is particularly applicable, control of the automatic telephone answering and message recording machine from a remote station for the purpose of repeating an already recorded message can take place by speaking, or transmitting, single vowels in a sequence for which the coding device of the answering machine is set. Since it is desirable to avoid all possible faulty operations of the machine, this control by vowel signals requires the provision of extensive and costly apparatus in order to accomplish the desired purpose. It is also to be considered that certain vowels are not transmitted faultlessly over the telephone line and the calling party must pronounce these vowels very distinctly, which is difficult in certain languages. In other cases of remote control of the machine, speech impulses between spoken numbers or buzzing sounds for operating the coding device in the machine has been used. However it has been found to be somewhat troublesome to produce accurately the speech impulses within the available short space of time between the spoken numbers or buzzing sounds. Still other arrangements have been used whereby the remote calling party calls an unlisted number of a line, to which the machine is also connected, to cause the machine to play back the recorded incoming messages.

In accordance with this invention, the above-noted objects are satisfactorily met by the provision of a unitary automatic telephone answering and message recording device, or machine, suitable for mounting and use on a desk or table, the general features and appearance corresponding to the machine such as disclosed in U.S. patent application Ser. No. 224,906 filed Sept. 20, 1962, by C. M. Martin et al., which is also similar to the machine such as disclosed in U.S. patent application Ser. No. 76,311, filed Dec. 16, 1960, by C. M. Martin et al., now U.S. Patent 3,226,478, issued Dec. 28, 1965 with the machine of the instant disclosure being modified in accordance with the below-listed specific features.

In accordance with the instant disclosure, magnetic recording and reproducing apparatus is provided, whereby outgoing and incoming messages are recorded on separate recording mediums, with means being provided whereby the recorded outgoing message may be checked by the local subscriber, the outgoing message may thereafter be transmitted to a calling party in response to the machine answering an incoming call, a function signal is transmitted at the end of the outgoing message to inform the calling party that he may start talking upon termination of the signal and the machine is conditioned for recording an incoming message under control of the outgoing message recording medium. The outgoing message and function signal is transmitted to the calling party in response to the answering of each incoming call by the machine, while each incoming message is recorded in sequence on the incoming message recording medium, with a pair of function signals being transmitted to the calling party as a signal to terminate the incoming message. Means is provided under control of the local subscriber for locally playing back any one or all of the recorded incoming messages and further means is provided under control of the local subscriber erasing the incoming messages.

More specifically, in accordance with the instant disclosure, and in response to receipt of the above-mentioned pair of function signals, which terminate the incoming message, the remote calling party causes a remote signal of a specific frequency to be transmitted over the telephone line to seize the machine and stop it from its present incoming message record function, whereby the machine thereafter operates in the rewind function and subsequently in the playback function to play back the previously recorded incoming messages. The remote seizing signal is also recorded on the incoming message medium and is later played back for use by the machine to cause it to momentarily be operated in a simultaneous rewind-erase function to erase the recorded remote seizure signal and thereafter disconnect the machine from the calling line. The remote calling party can restore the full recording capacity of the machine by reapplying the remote seize signal, before the pair of function signals is played back, to cause the machine to go into the rewind and erase function to erase all of the recorded incoming messages and to rewind the incoming message medium onto the supply reel and thereafter disconnect the machine from the calling line.

A feature of the invention relates to the provision of an outgoing message recording medium comprising a relatively short endless loop of magnetic tape that is driven in one complete revolution during each automatic answer and incoming message recording cycle of operation of the answering device, with a plurality of transparent windows, or gates, constructed at specific different successive locations therein, and including means in the device controlled by a pair of the windows in succession in response to said windows reaching a specific position during said one revolution of said outgoing message recording meduim for generating a pair of successive tone signals for transmission to the calling party that the device is conditioned for seizure in response to the subsequent receipt of a remote seizure signal therefrom for subsequent operation of the device in the remote call-back function.

Another feature of the invention relates to the provision of means in the device for maintaining said device in said condition for remote seizure for a predetermined period of time.

A further feature of the invention relates to the provision of means in the device operated in response to receipt of a remote seizure signal of a single predetermined frequency from the calling party for stopping said device from operating in the record function and for thereafter operating said device in the rewind function.

A further feature of the invention relates to the provision of means forming a portion of the incoming message recording medium for controlling other means in the device to stop said operation in said rewind function and to automatically operate said device in the play-back function.

A further feature of the invention relates to the provision of means in said device for recording said remote seizure signal on said incoming message recording medium, and other means in said device operated in response to the play-back of said recorded remote seizure signal for causing said device to stop from said playback function and be momentarily operated in a rewind-erase function to erase only said recorded remote seizure signal, and thereafter restore said device to a standby condition.

Still another feature of the invention relates to the provision of means in said device operated in response to the receipt of a reapplication of said remote seizure signal by the calling party immediately before the play-back of said recorded first seizure signal, for stopping said device from said play-back function and operating said device in the rewind and erase function to restore the incoming message recording capacity of said device to maximum.

A still further feature of the invention relates to the provision of means in the device controlled by said means operated by the first remote seizure signal for transmitting a signal to the remote calling party as an indication that the device has responded to the remote seizure signal and is operating in the rewind function, and the means also controlled by said means operated by the reapplication of the remote seizure signal for transmitting a signal to the remote calling party that the device has responded to the reapplication of the remote seizure signal and is operating in the rewind and erase function.

In a preferred embodiment of this invention, the recording mediums are disclosed as consisting of magnetic tapes, wherein the outgoing message medium comprises a relatively short endless loop of tape that is driven in one complete revolution from the stop position back to the same position during each operating cycle, and the incoming message tape, which is capable of recording a plurality of incoming messages totaling approximately two hours, is wound on a supply reel and rewound on a takeup reel as the incoming messages are received and recorded thereon. Certain control means are provided, whereby an outgoing message may be dictated and recorded on the outgoing tape and this outgoing message thereafter played back for checking purposes, and for rewinding the incoming message tape onto the supply reel in order to play back or erase the incoming message and for repeating these various operations as the situations may require. Other control means are provided to enable the machine to automatically answer an incoming call and record an incoming message; and if desired to further enable the machine to be operated by a remote calling party to play back all recorded incoming messages to the calling party, with the machine being controlled thereby to either disconnect from the calling line after the playback function, or being operated in the rewind and erase function to restore its recording capacity to maximum.

The nature of the invention and its distinguishing features and advantages will be more clearly understood from the following detailed operational description and the accompanying drawings in which:

FIGS. 1, 2, 3, and 4, show in schematic form the circuit arrangement of the improved automatic telephone answering and message recording machine embodying the novel features of the invention.

In its preferred form, such as disclosed in the present application, a general description of the invention will now be given.

*General description*

Figures 4, 5, 6, 7:
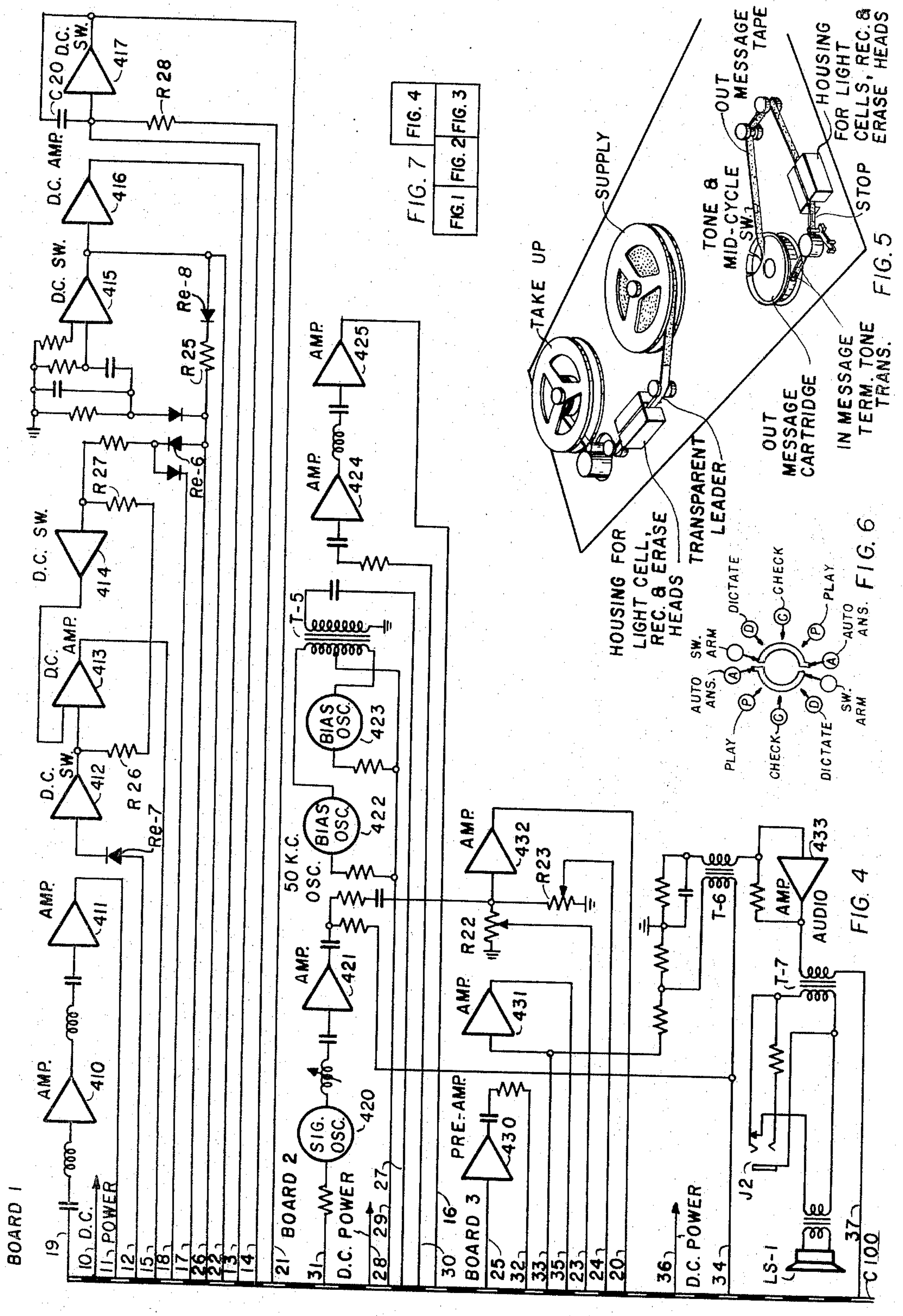
FIG. 5 shows in diagrammatic form, the tape deck arrangement of the incoming message tape and reels and the outgoing message tape and cartridge.
FIG. 6 shows a portion, or one level of the wafer type function selector switch S1, wherein right and left switch arms are disclosed as having access to contacts in the particular level, and further showing the individual right and left groups of contacts accessible by the switch arms and the corresponding positions of the contacts in each of the levels.
FIG. 7 is a figure-number diagram showing the arrangement of FIGS. 1, 2, 3, and 4 of the drawings, inclusive.

Reference will be had with FIGS. 1 through 6 of the drawings, with FIGS. 1, 2, 3, and 4 arranged according to the figure-number diagram as shown in FIG. 7.

At the start of this general description, it is thought advisable to briefly discuss the various components of the machine in order to better understand and follow the subsequent detailed operational descriptions. The power cord of the machine (FIG. 3) is plugged into a conventional 115 volt 60 cycle alternating current supply, with this power being thereafter available to transformers T–1 and T–4 and to certain other components in the machine. Heraafter, throughout the specification, the term "power supply" shall refer to the 115 volt 60 cycle alternating current supply.

It will be appreciated that while the various components shown in FIG. 4 of the drawings represent various amplifiers, direct current switches and oscillators and may be of any suitable type, these components in their preferred form in applicants' improved machine consist of transistors with their associated circuit elements arranged in a well-known and suitable manner, whereby the specific functions are satisfactorily accomplished. It will also be appreciated that these components have been arranged in sections entitled "Board 1," "Board 2," and "Board 3" and that only a sufficient amount of apparatus has been shown therein, in order to provide sufficient structure to support the operational descriptions. Therefore, for the sake of simplicity, numerous components such as condensers and resistors have been eliminated from the drawings.

The various control switches designated by the reference characters S1 through S13, inclusive, represent switches of different types, with function selector switch S1 being shown as a multi-level rotary switch of the wafer type; switches S2, S3, S4, S8 and S13 being shown as single-pole single-throw types; switches S5, S6 and S7 being shown as non-locking lever, or push button, types; switches S9, S10 and S11 being single-pole single-throw types controlled by mechanical linkages (not shown in detail) extending from the shaft of selector switch S1, when this switch is in certain specific positions; and switch S12 being shown as a double-pole double-throw locking lever, or push button, type.

It will be appreciated that the automatic telephone answering and message recording machine, as disclosed, is designed to be operated and controlled in six basic functions namely, "Dictate Announcement," "Check Announcement," "Automatic Answer and Record," "Automatic Remote Call-Back," "Rewind and Playback" and "Rewind-Erase."

It will further be appreciated that all of the above-entitled functions will be described briefly in this general description and that only the "Automatic Answer and Record" and the "Automatic Remote Call-Back" functions will be described in detail in their respective sections, since it is believed that the invention is adequately described in these two sections and it is desired to avoid unnecessary repetition.

To place the machine in standby condition for the "Dictate Announcement" function, the power cord is plugged into the source of alternating current supply, interlock switch S2 is closed, On-Off switch S3 is closed to the On position, On-Off power lamp LA1 is lighted, the dictating microphone (not shown) is plugged into jack J1, which is connected to the dictate (D) contact in level S1–E of switch S1, and function selector switch S1 is rotated to the Dictate (D) position. Since On-Off switch S3 is in the On position, the primary windings of transformers T–1 and T–4 are energized and lamps LA5, LA6 and LA7 are lighted, however since the outgoing message tape is in the Stop position, light from lamp LA7 only passes through the lower, or Stop, window therein to the light sensitive cell LC–1, which in turn passes current to maintain start stop relay 120 operated.

Before continuing further with the above-entitled "Dictate Announcement" operation, it is thought best to mention that the entire tape transport mechanism 300 (represented by a rectangle at the right-hand side of FIG. 3) is not shown in specific detail. Therefore, while the out message capstan motor, the in message record and playback motor, the rewind motor and the forward motor are disclosed, the various control relays, their circuits and the circuits controlled thereby for controlling these motors are not shown. Since the arrangement of this specific tape transport mechanism is shown in detail in the aforementioned Martin application, Ser. No. 224,906, it is not believed necessary to repeat this disclosure in the instant application, as the features herein are not dependent on the detailed disclosure of the transport mechanism. Therefore, only a minimum number of control conductors are shown as extending into the tape transport mechanism for operating the motors in the desired functions.

As mentioned above, the machine is in the standby condition and in readiness to be operated in the "Dictate Announcement." Start switch S8 is thereafter held operated for a period of time sufficient for the machine to start its operation in this function, whereby the out message capstan motor in the tape transport mechanism 300 is energized and start lamp LA2 is lighted. The out message motor thereupon advances the out message tape until the lower, or stop, window passes from in front of the light sensitive cell LC–1, whereby transmission of light from lamp LA7 is blocked by the out message tape and start relay 120 restores to lock the out message motor operated. The out message motor continues to advance the out message tape, with the outgoing message being dictated and recorded thereon by means of pickup head PU4, with this message normally not exceeding approximately 20 seconds. The end of the outgoing message recording time is indicated by an audible tone reproduced through the playback speaker LS–1. The initiation of this tone is controlled at the time that the first upper transparent window appears in front of lamp LA6, with light therefrom passing through this window to the light sensitive cell LC–2, which thereby passes current for operating tone relay 220. The operation of tone relay 220 energizes the signal tone oscillator section in Board 2 of FIG. 4 to transmit a signal that is then amplified and transmitted to the playback speaker LS–1 as an audible indication that the time for recording the outgoing announcement has expired. As the outgoing message tape continues to advance, the first upper window therein passes from in front of the lamp LA6 and light sensitive cell LC–2 no longer passes current to thereby restore tone relay 220, which deenergizes the signal tone oscillator and stops the audible tone. The outgoing message tape continues to advance until the pair of upper windows therein appear and allow light from lamp LA6 to operate light sensitive cell LC–2 twice in quick sucession to reoperate tone relay 220 a corresponding number of times and cause the tone signal oscillator to transmit a double tone signal for audible reproduction as mentioned above. The time interval between the first, or single, tone signal and the double tone signal corresponds to the time available to the calling party for recording his incoming message. In other described operations, it will be noted that the double tone signal is transmitted to the calling party as an indication that he should thereafter discontinue his incoming message. The out message capstan motor continues to advance the out message tape until the Stop window in the tape reappears in front of lamp LA–7, whereby light is transmitted through the window to the light sensitive cell LC–1 to cause it to again pass current for reoperating start stop relay 120. Relay 120 reoperates and opens the circuit to stop the out message capstan motor, thereby placing the machine in the standby condition.

To operate the machine in the "Check Announcement" function, it will be appreciated that the machine is in the standby condition and that the function selector switch S1 is rotated to the Check (C) position. In order for the machine to start playing back the recorded outgoing message, start switch S8 is again momentarily depressed, which energizes the out message capstan motor in the tape transport mechanism to advance the out message tape as previously described, with the exception that the outgoing message pickup head PU4 extends the previously recorded message to the audio amplifiers of Board 3 in FIG. 4 where it is amplified, applied to the audio power amplifier 433, transmitted to the playback speaker LS–1 and audibly reproduced. The subsequent operations of the machine for the remainder of this function are the same as mentioned in the "Dictate Announcement."

To operate the machine in the "Automatic Answer and Record" function, it will be appreciated that the machine is in the standby condition as previously described, with the exception that the function selector switch S1 is rotated to the Auto Answer (A) position and the previously mentioned linkage therefrom has operated switch S10 to close contacts S10–1 and open contacts S10–2. The machine remains in this condition until an incoming call is received over the subscriber's telephone line, at which time ringing current received over line conductors +L and −L is rectified for operating ring relay 110 in a well-known manner. The operation of ring relay 110 completes a circuit to energize the out message capstan motor to advance the out message tape in the same manner as previously described, whereby light sensitive cell LC–1 ceases passing current as described and restores start stop relay 120, which completes a circuit for operating line load relay 210 to simulate the answer operation by a telephone set when answering an incoming call. The out message capstan motor continues to advance the out message tape, with pickup head PU4 extending the outgoing message from the tape to the audio amplifiers, where the signal is amplified and extended to the calling line by means of repeat coil RC–1. When the first upper window in the outgoing message tape appears in front of lamp LA6, light therefrom causes light sensitive cell LC–2 to pass current for operating tone relay 220. Tone relay 220 completes a circuit for operating mid cycle switching relay 230 and also energizes the tone oscillator, which generates a signal tone that is amplified and extended to the calling line by way of repeat coil RC–1 as an indication to the calling party that the outgoing message has ended and that he may begin his incoming message. Mid cycle switching relay 230 disconnects pickup head PU4 from the audio amplifier section and extends a connection from the repeat coil RC–1 thereto, whereby the incoming voice signals are amplified. Relay 230 connects the output from the audio amplifier section to pickup head PU2 for subsequently recording the incoming message on the in message tape and further completes a circuit for operating the in message record and playback motor to advance the in message tape. The out message capstan motor continues to operate and advance the out message tape simultaneous with the operation of the in message motor, whereby after the single tone is removed from the calling line, the calling party may start talking and his message will be recorded. The length of the incoming message is determined by the time that it takes for the pair of upper windows in the out message tape to appear in front of lamp LA6, subsequent to the single upper window leaving lamp LA6, whereupon tone relay 220 is operated twice in quick succession as previously mentioned to energize the tone signal oscillator to generate a double tone signal for transmission to the telephone line to inform the calling party that the time for recording the incoming message is about to expire. The out message capstan motor continues to advance the out message tape until the Stop window therein appears in front of lamp LA7 to cause light sensitive cell LC–1 to pass current to operate the start stop relay 120, which opens circuits to the line loading relay 210, the midcycle switching relay 230 and to the out message motor. The out message motor stops to prevent further advance of the out message tape. The line loading relay 210 restores to electrically disconnect the answering machine from the telephone line, and the midcycle switching relay 230 restores to disconnect the output of the audio amplifier from the incoming message recording head PU2 and opens the circuit to the in message record and playback motor, which stops further advance of the in message tape. The answering machine is now restored to the normal standby condition.

Figure 1:
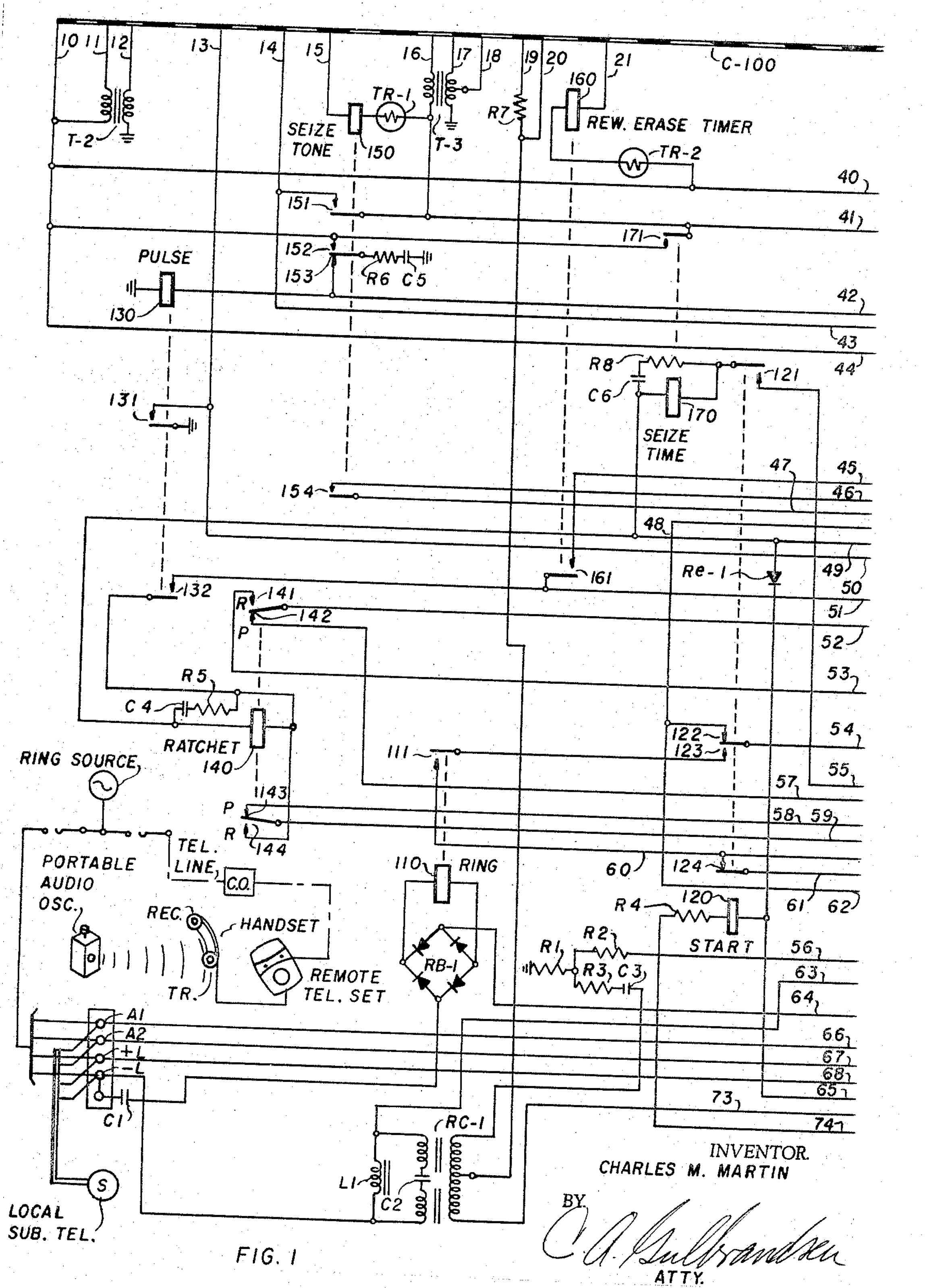
Figure 2:
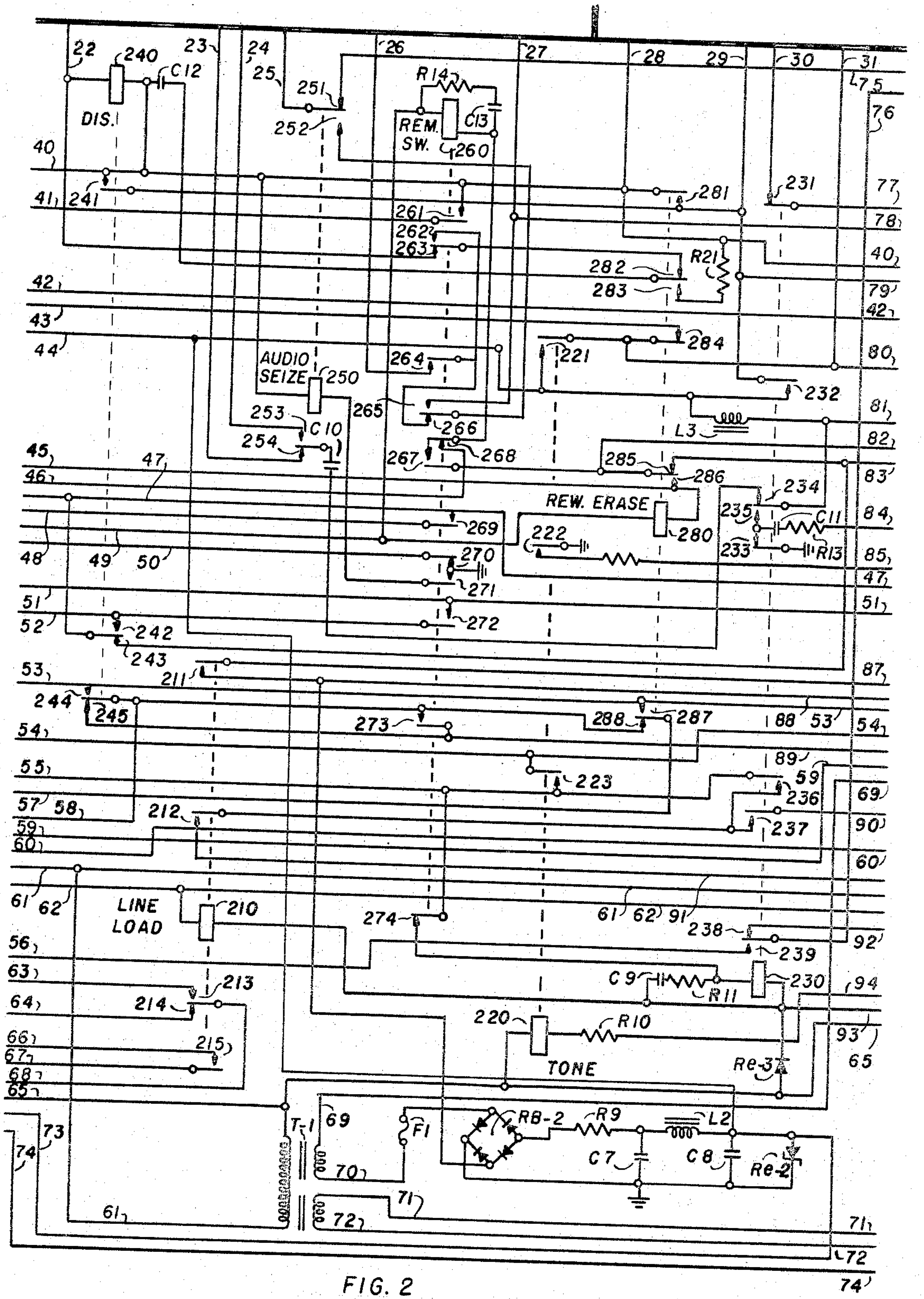
Figure 3:
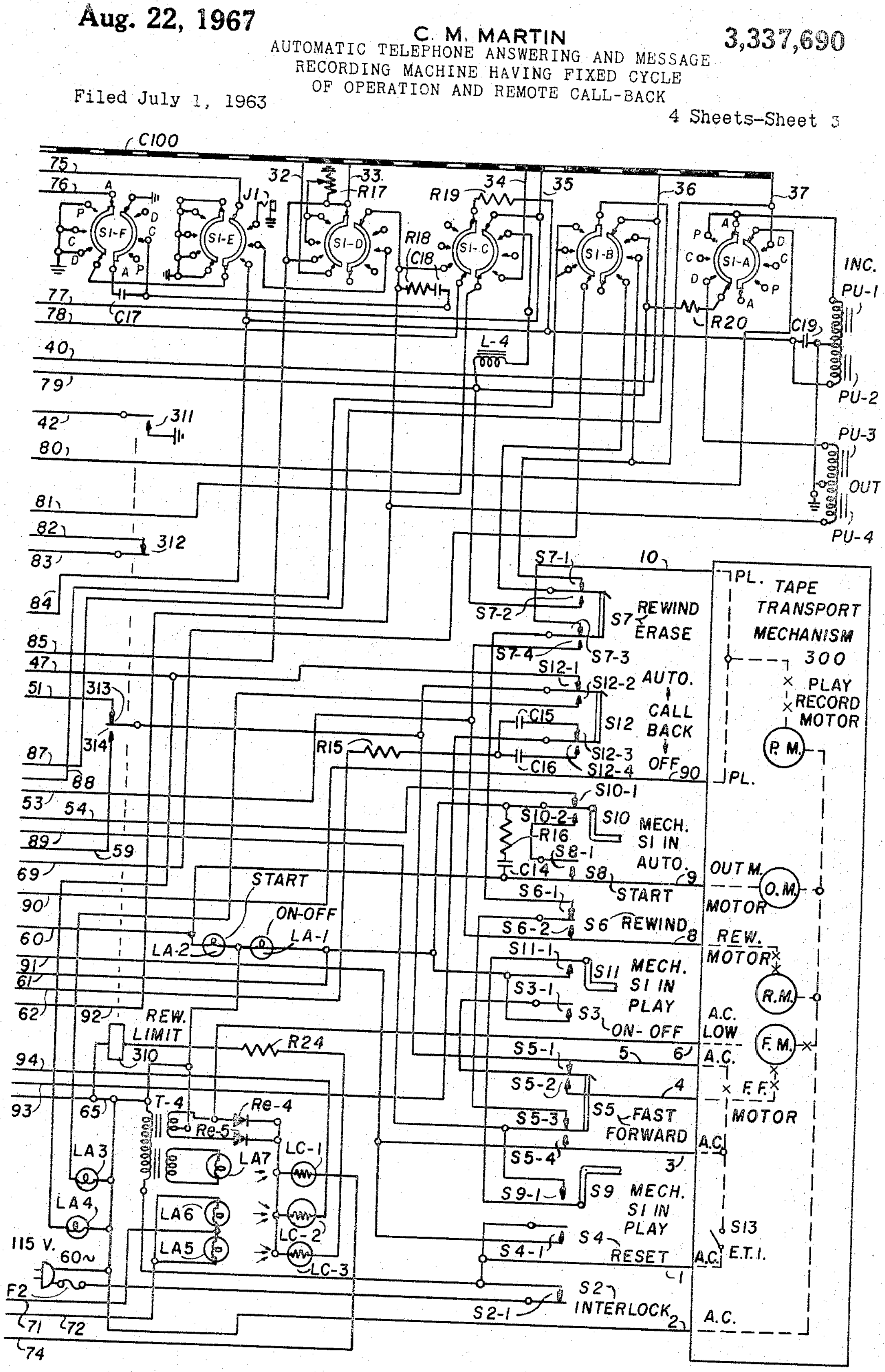

To operate the machine in the "Automatic Remote Call-Back" function, it will be appreciated that the machine is in the standby condition as previously described and that the function selector switch S1 is rotated to the Auto Answer (A) position, switch S10 is operated by the mechanical linkage from switch S1 to close contacts S10–1 and open contacts S10–2, and call back switch S12 is operated to the Auto position and locked. Auto call back lamp LA4 is lighted as an indication that the machine is in the call back condition. With the machine in the standby condition and the above-mentioned switches in the noted positions, the machine operates in the same manner as described in the description of the "Automatic Answer and Record" function, up to and including the point wherein tone relay 220 was operated twice in quick succession to cause the transmission of a pair of tones to the calling party as an indication that the time allotted for recording his incoming message was about to expire and that the incoming message should be terminated. When the Stop window in the out message tape reappears in front of lamp LA7, light therefrom causes light sensitive cell LC–1 to pass current for reoperating start stop relay 120, which opens the locking circuits of line load relay 210 and the out message capstan motor as previously described. Line load relay 210 does not immediately restore since call back switch S12 is in the Auto position, but is held operated for a period of about ten seconds, which is the only time that the machine can be seized from a remote calling party. The remote calling party may first speak a special short message which is recorded, and then operate a portable type oscillator as shown in FIG. 1 to place a remote seizure signal on the telephone line during the ten second time interval. The remote seizure signal is received at the machine and recorded on the in message tape (since the machine is still operating in the record operation) and the signal is also amplified and rectified to operate seize tone relay 150. Seize tone relay 150 causes the machine to transmit and acknowledging tone back to the remote calling party as an indication that the machine has been seized and also completes a circuit for energizing remote switching relay 260; which prepares the machine for playback of the previously recorded incoming messages to the remote calling party; maintains line load relay 210 operated and restores the midcycle switching relay 230. Seize tone relay 150 restores in response to the termination of the remote seizure signal and completes a circuit for operating pulse relay 130, which in turn momentarily operates ratchet relay 140 to switch its contacts from the play position to the rewind position. The machine thereafter operates in the rewind function until a transparent leader, which is spliced onto the end of the incoming message tape, appears in front of lamp LA5, whereby light therefrom causes light sensitive cell LC–3 to pass current for operating the rewind limit relay 310. Rewind limit relay 310 momentarily reoperates ratchet relay 140 to cause the relay to switch its contacts from the rewind position back to the play position. The machine thereafter operates in the play function to playback the previously recorded incoming messages to the remote calling party by means of playback head PU2. If the remote calling party does not want to erase the previously recorded incoming messages, the machine is allowed to continue in the playback operation and when the previously recorded remote seizure signal is also played back, this recorded portion of the remote seizure signal is amplified and rectified and causes the operation of disconnect relay 240, which in turn operates the locking circuit of rewind switching relay 260, stops the operation of the machine in the playback function and causes the machine to operate in a momentary rewind-erase function. Disconnect relay 240 must be held operated for a short period of time, since the machine has stopped from the playback function, whereby the machine operates in the rewind-erase function for this short period of time to erase the previously recorded remote seizure signal. Remote switching relay 260 restores to complete the circuit for momentarily maintaining disconnect relay 240 operated for the short period of time, opens the playback message audio circuit, opens the locking circuit to line load relay 210 and transfers control of the alternating current power supply to the disconnect relay 240. Disconnect relay 240 restores upon the expiration of the momentary holding period and stops the operation of the machine from the momentary rewind-erase function. Line load relay 210 has been held operated for a period of time and upon the expiration of this period, disconnects the machine from the telephone line, whereby it is again in the standby condition.

It will be noted that if the calling party desires to erase all of the previously recorded incoming messages after they have been played back and thus restore the full recording capacity of the machine, he must reoperate his portable oscillator to reapply the remote seizure signal just after he has heard his recorded special message and before the playback of the recorded remote seizure signal, whereupon seize tone relay 150 is reoperated. The reoperation of seize tone relay 150 causes the machine to transmit an acknowledging signal to the calling party that the machine has responded to the reapplication of the remote seizure signal. The reapplied remote seizure signal is continued for a sufficient length of time, whereby rewind erase timer relay 160 is operated to complete a circuit for operating rewind erase relay 280. In operating, rewind erase relay 280 energizes the erase head PU1 by direct current, removes the acknowledging tone from the telephone line, completes circuits to operate the machine in the rewind function and opens the operating circuit to stop the machine from the play function. The remote calling party terminates the reapplication of the remote seizure signal to the line, subsequent to the acknowledging tone being removed from the telephone line, whereby seize tone relay 150 restores to momentarily operate pulse relay 130, which in turn momentarily operates ratchet relay 140. Ratchet relay 140 thereupon opens its play contacts and closes its rewind contacts to provide a new path for continuing to operate the tape transport mechanism in the rewind function. The machine operates in the rewind and erase function to erase all of the previously recorded incoming messages on the in message tape, with the aforementioned transparent leader appearing at the end of the in message tape to cause the operation of rewind limit relay 310 as previously described. Rewind limit relay 310 operates to restore rewind switching relay 260 and rewind erase relay 280 to momentarily operate ratchet relay 140 and to stop the operation of the machine in the rewind erase function. Ratchet relay 140 opens its rewind contacts and closes its play contacts to operate the machine in the play function and advance the in message tape sufficiently to cause the transparent leader to disappear from between lamp LA5 and light sensitive cell LC–3, thereby restoring rewind limit relay 310. Remote switching relay 260 and rewind erase relay 280 have restored in the meantime, followed by the restoring of line load relay 210, whereby the machine disconnects from the calling telephone line and is in the standby condition.

To operate the machine in the "Rewind and Play-back" function, it will be appreciated that the machine is in the standby condition as just described, with the exception that the function selector switch S1 is rotated to the Play-back (P) position and the previously mentioned linkages are operated to close the contacts of switches S9 and S11. The machine immediately starts to operate in the play function, however when rewind switch S6 is operated to close its contacts S6–2, the circuit is opened to stop the machine from the play function and a circuit is completed to operate it in the rewind function. When the machine has operated in the rewind function to rewind the incoming message tape to the desired location, rewind switch S6 is released and the machine stops from the rewind function and immediately goes into the play function, with pickup head PU2 extending the recorded message for amplification and audible reproduction over loud-speaker LS–1. It will be noted that after the machine was operated in the rewind function and then operated in the play function, the machine may be further controlled to quickly advance the in message tape to another desired spot for playback, by operating fast forward switch S5 (while rewind switch S6 is at normal), which causes the forward motor in the tape transport mechanism to operate at full speed and rapidly advance the tape. When fast forward switch S5 is restored to normal, function selector switch S1 may be rotated to the Auto Answer (A) position to allow the machine to stop and revert to the standby condition.

To operate the machine in the "Rewind-Erase" function, it will be appreciated that the machine is in the standby condition and that the function selector switch S1 is rotated to the Playback (P) position and that the previously mentioned linkages from switch S1 are operated to close the contacts of switches S9 and S11, whereby the machine immediately goes into the play operation as previously described. To cause the machine to go into the rewind-erase function, rewind switch S6 is operated to close its make contacts and cause the machine to go into the rewind function, and rewind-erase switch S7 is also operated to extend the direct current erase potential to pickup PU1 to erase the previously recorded incoming messages during the rewind operation. When switches S6 and S7 are restored to normal and function selector switch S1 is rotated to the Auto Answer (A) position, the machine stops from the rewind-erase function and is again in the normal standby condition.

Having given a general description of the operational functions of the machine, a detailed operational description will now follow covering the "Automatic Answer and Record" and "Automatic Remote Call-Back" functions.

*Automatic answer and record*

In order to describe the above-entitled operational description, it will be assumed that the local subscriber S is absent from his office and that he desires to have the machine automatically answer incoming telephone calls to his telephone, transmit a pre-recorded message and thereafter record incoming messages. Reference will be had with FIGS. 1 through 4, inclusive, arranged according to the figure-number diagram as shown in FIG. 7, for this description.

In order to provide the above-mentioned service, it is assumed that the machine is in the standby condition as previously described in the general description and that the function selector switch S1 is rotated to the Auto Answer (A) position. Call-back switch S12 is in the Off position. The On-Of switch S3 is in the On position, whereby lamp LA1 is burning and the primary winding of transformer T–4 is energized and lamp LA–7 is also burning. Light from lamp LA7 passes through the Stop window in the out message tape to operate the light sensitive cell LC–1, which in turn allows current to pass in a well-known manner to maintain start-stop relay 120 operated. The machine is thus in the standby condition and no further operations will take place until an incoming call is received.

It is assumed that an incoming call is routed to the telephone line of local subscriber S from the central office by way of line conductors +L and −L to the terminal block shown in the lower left hand corner of FIG. 1, and that ringing current is placed on these line conductors by the ringing source in a well-known manner. This ringing current, which corresponds to an alternating current signal, is received at the answering machine and rectified by means of the rectifier bridge RB–1, with this rectified current thereafter operating the ring relay 110 over an obvious circuit.

Since it has been mentioned that the machine is in the standby condition, lamp LA3 is lighted as an indication that the machine is in the automatic answer condition and the out message tape is in the stop position, whereby, as previously mentioned, light from the lamp LA7 is transmitted through the lower, or stop window of the tape, for operating the light sensitive cell LC–1 to pass current for maintaining start-stop relay 120 operated. The circuit for providing the energizing current to relay 120 may be traced as extending from the fused side of the A.C. power source, contacts S2–1 of switch S2, the primary winding of transformer T–4 and to the return side of the power source. The induced current in the upper right-hand secondary winding of transformer T–4 extends through rectifiers R*e*–4 and R*e*–5, light sensitive cell LC–1, conductor 74, resistance R4, the winding of relay 120, conductor 65 and to the return side of the power source.

In actuating its contacts, start-stop relay 120 performs no useful function at contacts 121 for the time being, opens contacts 122 to prevent the line loading relay 210 from operating at the present, closes contacts 123 to prepare a point in the energizing circuit to the start lamp LA2 and to the out message capstan motor in the tape transport mechanism 300, and opens an alternate power supply circuit to the start lamp LA2 and to the capstan motor at contacts 124. The machine is thus in standby condition.

In actuating its contacts in response to receipt of the rectified ringing signal, ring relay 110 completes an energizing circuit to start lamp LA2 and to the out message motor in the tape transport mechanism 300 at contacts 111. This circuit may be traced as extending from the fused side of the A.C. power source, contacts S2–1 of switch S2, conductor 1 into the tape transport mechanism, switch S13, from the tape transport mechanism over conductor 5, contacts S5–1 of switch S5, contacts S3–1 of switch S3, contacts S10–1 of switch S10, conductor 54, contacts 123, 111, conductor 60, and (1) through start lamp LA2 to the return side of the power source, and (2) over conductor 9 to the out message capstan motor and out over conductor 2 to the return side of the line. The lighting of start lamp LA2 is an indication that the out message motor is energized and started. It will be noted that ring relay 110 is operated only for relatively short periods of time corresponding to each received pulse of ringing current. After a sufficient number of operations, the out message tape will be advanced by the capstan motor to a position where the lower, or stop, window therein is no longer between the lamp LA7 and the light sensitive cell LC–1. At this time, light sensitive cell LC–1 ceases passing current and start-stop relay 120 restores.

In restoring, start-stop relay 120 closes contacts 124 to complete a locking circuit for maintaining the out message motor and the start lamp LA2 energized, opens the original energizing circuit to the out message motor and start lamp LA2 at contacts 123, closes contacts 122 to complete an operating circuit for the line load relay 210 and performs no useful function for the time being by opening contacts 121. The circuit for energizing line load relay 210 may be traced as extending from the fused side of the power supply, contacts S2–1 of switch S2, conductor 1 into the tape transport mechanism 300, switch S13, conductor 5 from the tape transport mechanism, contacts S5–1 of switch S5, contacts S3–1 of switch S3, contacts S10–1 of switch S10, conductor 54, contacts 122, down over conductor 62, the winding of line load relay 210, rectifier R*e*–3, conductor 65 and to the return side of the power source.

In actuating its contacts, line load relay 210 closes contacts 211 to connect the upper right-hand winding of power transformer T–1 to the rectifier bridge RB–2 to provide the necessary low voltage direct current power for use by the amplifier and oscillator sections in FIG. 4, prepares a point in a future holding circuit to midcycle switching relay 230 at contacts 212, closes contacts 213 to connect the repeat coil RC–1 to the telephone line, opens contacts 214 to remove the rectifier bridge RB–1 from the line and closes contacts 215 to provide control functions at the local subscriber's telephone in case his subset is of the multi-line key type. It will be noted that alternating current power is connected to the primary winding of power transformer T–1 over a circuit extending from the fused side of the power source, contacts S2–1 of switch S2, conductor 1 into the tape transport mechanism 300, switch S13, conductor 5 from the tape transport mechanism, contacts S5–1 of switch S5, contacts S3–1 of switch S3, conductor 61, through the primary winding of transformer T–1, conductor 65, and to the return side of the power source. It will be noted that the left-hand winding of repeat coil RC–1 and the parallel-connected inductance L–1 are connected directly across the telephone line conductors to simulate the answering of a call by loading the line, such as when hook switch contacts of a telephone set are closed in response to the removal of the handset.

The low voltage direct current output from the direct current power supply, comprising essentially the rectifier bridge RB–2 is extended upward over conductor 44 and to Board 1 by way of conductor 10 and cable C100, to Board 2 by way of conductor 40, conductor 28 and cable C100, and to Board 3 by way of conductor 40 and conductor 36 and cable C100. While this low voltage direct current power is only shown as extended to boards 1, 2 and 3 and not directly connected to any of the components therein, this D.C. low voltage power is utilized thereat in a common and well-known manner.

The out message capstan motor in the tape transport mechanism continues to advance the out message tape, with the recorded outgoing message being extended from pickup head PU4, conductor 92, contacts 238, conductor 76, contact A engaged by the left-hand wiper in level S1F of switch S1, contact A engaged by the right-hand wiper in level S1E of switch S1, conductor 75, contacts 251, conductor 25, cable C100, conductor 25, preamplifier 430, conductor 32, cable C100, conductor 32, left-hand wiper engaged with contact A in level S1D of the switch S1, conductor 33, cable C100, conductor 33 to the amplifier 431, conductor 35, cable C100, conductor 35, the right-hand wiper engaging contact A in level S1C of switch S1, conductor 81, contacts 234, condenser C10, contacts 254, conductor 23, cable C100, conductor 23, amplifier 432, conductor 20, cable C100, conductor 20, and to the center tap of the right-hand winding of repeat coil RC–1.

The outgoing message is thereafter extended by way of the left-hand winding of repeat coil RC–1 to the calling line over line conductors +L and −L. The machine remains in the outgoing message transmission function and subsequent to the end of the outgoing message, the first upper single window in the out message tape appears between the lamp LA6 and the light sensitive cell LC–2, whereby light sensitive cell LC–2 is rendered conductive and passes current to operate tone relay 220. This circuit for operating tone relay 220 may be traced as extending from the upper right-hand winding of transformer T–4 through the rectifiers Re–4 and Re–5, light sensitive cell LC–2, conductor 94, resistance R10, the winding of tone relay 220, conductor 65 and back to the center tap of the upper right-hand winding of transformer T–4.

In actuating its contacts, tone relay 220 closes contacts 221 to extend the low voltage direct current from the power supply to the 1400 cycle oscillator section of Board 2 in FIG. 4, provides no useful function for the time being at contacts 222 and at contacts 223 completes a circuit for energizing the midcycle switching relay 230. The energizing circuit for the 1400 cycle oscillator may be traced as extending from the rectifier bridge RB–2 upward through contacts 221, conductor 31, cable C100, conductor 31 and to the 1400 cycle signal oscillator 420. The 1400 cycle signal therefrom extends to amplifier 421, to amplifier 432, conductor 20, cable C100, conductor 20 to the middle tap of the right-hand winding of repeat coil RC–1 and out over the line conductors +L and −L to the calling line. This 1400 cycle tone is heard by the calling party and serves as an indication that he may commence his incoming message immediately thereafter.

The circuit for operating midcycle switching relay 230 may be traced as extending from the fused side of the power source, contacts S2–1 of switch S2, conductor 1 into the tape transport mechanism 300, switch S13, conductor 5 from the tape transport mechanism, contacts S5–1 of the switch S5, contacts S3–1 of switch S3, contacts S10–1 of the switch S10, conductor 54, contacts 223, 274, the winding of midcycle switching relay 230, rectifier Re–3 and to the return side of the power source.

It will be noted at this time that tone relay 220 will remain operated for the length of time that the single upper window in the out message tape is passing light from the lamp LA6 to the light sensitive cell LC–2 and that as soon as the window has disappeared from this particular position, light sensitive cell LC–2 no longer will pass current and tone relay 220 will restore, with the exception that the midcycle switching relay 230 will have operated before the tone relay 220 restores.

In actuating its contacts, midcycle switching relay 230 performs no useful function for the time being at contacts 231, closes contacts 232 to extend the low voltage direct current to the 50 kc. recording bias oscillator section in Board 2 of FIG. 4, performs no useful function for the time being at contacts 233, opens contacts 234 and closes contacts 235 to transfer the output of amplifier 432 of Board 3 from the center tap of the right-hand winding of repeat coil RC–1 to the incoming message record head PU2, closes contacts 236 to complete a locking circuit for itself, closes contacts 237 to extend power to the tape transport mechanism 300 to operate it in the record operation, opens contacts 238 to disconnect the outgoing message announcement head PU4 from the amplifier section of Board 3 and closes contacts 239 to extend the incoming message from repeat coil RC–1 to the amplifier section of Board 3.

The 50 kc. recording bias oscillator section of Board 2 is energized over a circuit extending from the rectifier bridge RB–2 up through contacts 232, conductor 29, cable C100, conductor 29 and to bias oscillators 422 and 423 in parallel. The circuit for recording the incoming message may be traced as extending from the upper tap of the right-hand winding of repeat coil RC–1, condenser C3, resistance R3 and R2, conductor 56, contacts 239, conductor 76, contact A engaged by the left-hand wiper in level S1F of switch S1, contact A engaged by the right-hand wiper in level S1E of switch S1, conductor 75, contacts 251, conductor 25, cable C100, conductor 25, preamplifier 430, conductor 32, cable C100, the left-hand wiper engaged with contact A in the level S1D of switch S1, conductor 33, cable C100 conductor 33, amplifier 431, conductor 35, cable C100, conductor 35, the right-hand wiper engaged with contact A in level S1C of switch S1, conductor 81, contacts 235, condenser C11, resistance R13, conductor 84, and to the incoming message record head PU2. The locking circuit for midcycle switching relay 230 may be traced as extending from the fused side of the power source through contacts S2–1 of switch S2, conductor 1 to the tape transport mechanism 300, switch S13, conductor 3 from the tape transport mechanism, conductor 91, contacts 212, 236, 274, the winding of midcycle switching relay 230, rectifier Re–3, conductor 65 and to the return side of the power source.

The circuit for operating the machine in the record operation may be traced as extending from the fused side of the power source through contacts S2–1 of switch S2, conductor 1 to the tape transport mechanism 300, switch S13, conductor 3 from the tape transport mechanism, conductor 91, contacts 212, 237, conductor 90, the record apparatus in the tape transport mechanism and out over conductor 2 to the return side of the power source.

It will be noted that the out message capstan motor of the tape transport mechanism continues to advance the out message tape simultaneous with the operation of the tape transport mechanism in the record operation, and that the incoming message is extended over the above traced circuit for recording on the in message tape by the pickup head PU2. The incoming message is thereby recorded until this message terminates or until a pair of windows in the upper portion of the outgoing message tape appear in sequence between lamp LA6 and the light sensitive cell LC–2, at which time, light sensitive cell LC–2 passes current for operating tone relay 220 twice in succession in the same manner as previously described when the single tone signal was extended to the calling party. During the time that the first window of the pair is passing light to cause the light sensitive cell LC–2 to pass current, tone relay 220 is operated for causing the 1400 cycle oscillator 420 of Board 2 to be energized and generate a signal tone, which is amplified by amplifiers 421 and 432 and transmitted to the right-hand winding of the repeat coil RC–1 for transmission out over the calling line. This signal tone stops as soon as the first window of the pair is sufficiently advanced to prevent further transmission of light to the light sensitive cell LC–2, which thereupon ceases passing current and allows tone relay 220 to restore. The second window of the pair thereafter appears between lamp LA6 and light sensitive cell LC–2, which again passes current to re-operate tone relay 220 for causing the 1400 cycle signal oscillator to transmit a second signal tone to the calling line.

This double signal tone serves to inform the calling party that the time alotted for the recording of his incoming message is about to expire and that he should terminate his message.

Subsequent to the transmission of the double signal tone, the lower or Stop window in the out message tape appears between lamp LA7 and light sensitive cell LC–1, at which time light sensitive cell LC–1 passes current for re-operating start-stop relay 120.

In re-operating its contacts, start-stop relay 120 performs no useful function for the time being at contacts 121, opens the locking circuit to the line load relay 210 at contacts 122, prepares a future point in the starting circuit to the out message capstan motor in the tape transport mechanism at contacts 123 and opens the locking circuit at contacts 124 to the out message motor to stop further operation thereof.

Since call-back switch S12 is in the Off position as mentioned, it will be noted that resistance R15 and condenser C16 are connected in shunt of the winding of line load relay 210 by means of contacts S12–4. This RC combination of resistance R–15 and condenser C–16 serves no other function than to prevent contact chatter of line load relay 210 while it is operated. In view of the fact that the capacity of condenser C–16 is of such a low value, the charge on this condenser is insufficient to effect the release of line load relay 210. Therefore, line load relay 210 restores immediately.

In restoring, line load relay 210 opens contacts 211 to open the previously traced circuit from the upper right-hand winding of power transformer T–1 to the rectifier bridge RB–2 to remove direct current power from the sections of the machine, opens the locking circuit to the midcycle switching relay 230 at contacts 212, opens contacts 213 to disconnect the repeat coil RC–1 from the line, closes contacts 214 to connect the ringing current rectifier bridge RB–1 to the line and opens contacts 215 to remove specific control functions at the local subscriber's telephone in the event his subset is of the multi-line key type. The opening of contacts 212 removes power from the conductor 90 extending to the tape transport mechanism to prevent further operation of the tape transport mechanism in the play operation, thereby preventing further recording on the in message tape.

It will be appreciated that the machine has completed an entire cycle of operation in this present function and is now in the standby condition and in readiness for another selected operation.

A detailed operational description of the machine will now be given for the "Automatic Remote Call-Back" function.

*Automatic remote call-back*

Reference will be had with FIGS. 1 through 4, inclusive, arranged according to the figure-number diagram as shown in FIG. 7, for this description.

In order to describe the above entitled operational description, it will be assumed that the machine is in the standby condition as described in the previous section, with the exception that in addition to the various switches being positioned as mentioned, call-back switch S12 is operated from the Off to the Auto position and Auto call back lamp LA4 is lighted.

It will also be assumed that the machine has been operated to answer an incoming call, transmit an outgoing message and to record an incoming message all in the same manner as described in the previous section up to and including the point wherein tone relay 220 is operated twice in succession in response to the appearance of the pair of windows in the upper portion of the out message tape, which causes the machine to transmit a first and second successive tone to the calling party as an indication that the time allotted for the recording of his incoming message is about to expire and that this message should be terminated. The transparent Stop window in the lower section of the out message tape subsequently reappears to cause the reoperation of start relay 120, which opens the locking circuit of line load relay 210 and to the out message motor in the tape transport mechanism all as previously described.

At this point in the present operational description it is pointed out that as a result of call back switch S12 being positioned to the Auto position, contacts S12–3 complete a circuit for connecting resistance R15 and condenser C15 in shunt of the winding of line load relay 210. The capacity of condenser C15 is such that it will charge from the circuit that energized line load relay 210 and this RC network will discharge condenser C15 through the winding of relay 210 at the time that the above-mentioned locking circuit thereto was opened. Line load relay 210 is therefore held operated for the period of time required for condenser C15 to completely discharge, which for the desired operation has been found as necessary to exist for a period of approximately 10 seconds after the opening of the locking circuit of line load relay 210.

This period of 10 seconds, during which line load relay 210 is held operated from the above-described RC network, is designated as the remote seizure period during which the machine can be seized from a remote calling station.

It is therefore assumed that the calling party during this description is local subscriber S, and that subscriber S is at a remote station and desires to call in to his machine and have the machine play back all recorded messages left for him as a result of other incoming calls.

Therefore, when subscriber S calls his own local telephone number, the machine automatically answers the incoming call and transmits the outgoing message in the same manner as described in the previous section up to and including the point of operation mentioned above.

During the time that line load relay 210 is held operated by the RC circuit and in response to the reoperation of start relay 120, a circuit is completed for operating the seize time relay 170, which will remain operated under control of line load relay 210 and midcycle switching relay 230. This circuit may be traced as extending from the fused side of the power source through contacts S2–1 of switch S2, conductor 1 into the tape transport mechanism, switch S13, out over conductor 3 from the tape transport mechanism, conductor 91, contacts 212, 236, conductor 55, contacts 121, the winding of seize time relay 170, rectifier R*e*–1, conductor 65, and to the return side of the power source.

In actuating its contacts, seize time relay 170 extends low voltage direct current power to the temperature controlled resistance TR–1 and to the left-hand winding of transformer T–3 at contacts 171 to prepare for the future operation of the seize tone relay 150 in the event that a remote seizure signal is received at the machine during the 10 second period that is allocated for the remote seizure.

It is assumed that calling subscribed S has a small portable oscillator, such as shown in FIG. 1, of a well-known type capable of generating a tone of a specific frequency and that at some time during the 10 second seizure period of the machine, he will hold this oscillator to the transmitter of the handset and cause the oscillator to operate and generate the remote seizure signal for a specific period of time. Subscriber S may decide to record a short special message, before operating his oscillator, with this recorded message serving the purpose, during remote play back, of informing him of the location on the incoming message tape where he had called in from a remote station, and will be described more in detail later on in this specification. The remote seizure signal is received over the telephone line by the answering machine over the same circuit as a voice message and recorded.

The remote seizure signal is also extended into the machine and over a different circuit by way of the repeat coil RC–1, the center tap of the secondary winding thereof, resistance R7, conductor 19, through a tuned circuit to amplifier 410 of Board 1, FIG. 4, amplifier 411, conductor 11, cable C100, conductor 11 and through the primary winding of transformer T–2. This amplified signal is induced into the right-hand winding of transformer T–2 and extends over conductor 12, cable C100, conductor 12, rectified by rectifier R*e*–7 and applied to the direct current switch 412 of Board 1.

Before continuing with the further operational description of the remote seizure signal operating means, it is thought advisable to explain that the direct current switch 412 is normally conducting in its standby condition, with the output therefrom applied to the direct current amplifier 413. However the output from switch 412 is maintained at a specific potential, which prevents the direct current amplifier 413 from conducting. When the above-mentioned rectified signal is received at direct current switch 412, this signal is of such a potential as to stop further conduction of the switch, which results in an increase in the potential applied to the direct current amplifier 413 to cause this amplifier to go into conduction for extending a signal to operate seize tone relay 150.

It is pointed out that the machine continues to operate in the incoming message record function during the remote seizure thereof.

The circuit for operating seize tone relay 150 may be traced as extending from the output of direct current amplifier 413 over conductor 15, cable C100, conductor 15, the winding of seize tone relay 150, temperature controlled resistor TR1, contacts 171, conductor 44, and to the direct current power output from the rectifier bridge RB–2. Seize tone relay 150 thereafter remains operated for the duration of the remote seize tone signal.

In actuating its contacts, seize tone relay 150 closes contacts 151 to extend low voltage direct current as an energizing signal to the 1400 cycle oscillator section of Board 2 in FIG. 4, closes contacts 152 to complete an obvious direct current circuit for charging condenser C5 through resistance R6, performs no useful function for the time being at contacts 153 and closes contacts 154 to complete a circuit for energizing the remote switching relay 260.

The 1400 cycle tone oscillator is energized as mentioned over a previously traced circuit, with the output from this oscillator being extended to the telephone line over a previously traced circuit as an indication to calling subscriber S that the answering machine has responded to the remote seize tone. The circuit for operating remote switching relay 260 may be traced as extending from the fused side of the power source through contacts S2–1 of switch S2, conductor 1 into the tape transport mechanism 300, switch S13, conductor 5 extending from the tape transport mechanism, contacts S12–1 of the call back switch S12, conductor 47, contacts 154, conductor 46, contacts 268, the winding of remote switching relay 260, conductor 49, rectifier R*e*–1, conductor 65, and to the return side of the power source.

In actuating its contacts, remote switching relay 260 closes contacts 261 to extend low voltage direct current from the direct current power supply to the seize tone relay 150 to prepare for an alternate reoperating circuit of the relay if required, closes contacts 262 and opens contacts 263 to complete a circuit for charging condenser C12, opens contacts 264 to remove ground from the input circuit to the disconnect direct current amplifier 416 of Board 1 to prevent the possibility of a false disconnect operation from taking place when seizure occurs, closes contacts 265 and opens contacts 266 to prepare a point in the audio path from the incoming message playback head during remote playback of the machine, closes contacts 267 and opens contacts 268 to complete its own locking circuit, closes contacts 269 to maintain line load relay 210 operated, opens contacts 270 to remove ground from the direct current switch 417 of Board 1 in FIG. 4, closes contacts 271 to complete an obvious operating circuit for the audio seize relay 250, closes contacts 272 to complete a circuit from the power supply to the rewind and/or play operation switching circuits, closes contacts 273 to establish an alternate circuit path from the power supply for the play operation during the present function and opens contacts 274 to restore the midcycle switching relay 230. Midcycle switching relay 230 restores its contacts to condition the various circuits for future operation of the machine and opens the circuit to restore seize time relay 170.

The alternate circuit for supplying the low voltage direct current to the seize tone relay 150 may be traced as extending upward from the output of the rectifier bridge RB–2 to conductor 44, up and to the right over conductor 40, contacts 261, conductor 41, temperature controlled resistance TR–1 and to the seize tone relay 150. The locking circuit for remote switching relay 260 may be traced as extending from the fused side of the power source through contacts S2–1 of switch S2, conductor 1 into the tape transport mechanism 300, switch S13, over conductor 5 from the tape transport mechanism, contacts S12–1 of the call back switch S12, conductor 47, contacts 243, 285, 267, the winding of remote switching relay 260, conductor 49, rectifier R*e*–1, conductor 65, and to the return side of the power source. The circuit for locking line road relay 210 operated may be traced as extending from the fused side of the power source through contacts S2–1 of switch S2, conductor 1 into the tape transport mechanism 300, switch S13, out over conductor 5 from the tape transport mechanism contacts S12–1 of the call back switch S12, conductor 47, contacts 269, conductor 48, to conductor 62, through the line load relay 210, rectifier R*e*–3, conductor 65 and to the return side of the power source. The circuit for operating the audio seize relay 250 may be traced as extending from ground at contacts 271, the winding of audio seize relay 250, conductor 40, down to conductor 44, and to the output of the rectifier bridge RB–2.

As previously mentioned, when calling subscriber S received the 1400 cycle tone signal, which informed him that the machine had responded to the remote seizure tone, subscriber S thereby terminates the remote seizure tone. Seize tone relay 150 restores in response to the termination of the remote seizure tone, and at contacts 153 completes a circuit for the discharge of condenser C5 through the winding of pulse relay 130 to momentarily operate this relay.

In actuating its contacts, pulse relay 130 closes contacts 131 to momentarily apply a ground to conductor 13 extending to the erase timer direct current switch 417 of Board 1 in FIG. 4 to maintain a full charge on condenser C20 in order to assure proper timing of the operation of switch 417 when a rewind-erase function is desired, and closes contacts 132 to momentarily complete a circuit to the winding of ratchet relay 140 to momentarily operate this relay.

The circuit for operating ratchet relay 140 may be traced as extending from the fused side of the power source through contacts S2–1 of switch S2, conductor 1 into the tape transport mechanism 300, switch S13, over conductor 5 from the tape transport mechanism, contacts 313, conductor 51, contacts 132, the winding of ratchet relay 140, rectifier R*e*–1, conductor 65 and to the return side of the power source.

It is pointed out that the function of ratchet relay 140 is to electrically switch the machine alternately from the play to the rewind operation. The armature of relay 140 controls a ratchet (not shown) to alternately control contacts 141 through 144, inclusive, once per each energization in a well-known manner. In order to avoid confusion, contacts 142 and 143 of relay 140 will hereafter be referred to as the play contacts and contacts 141 and 144 will be referred to as the rewind contacts. It is further pointed out that at the end of a complete cycle of operation of the machine and in standby condition, play contacts 142 and 143 are closed and rewind contacts 141 and 144 are open, as shown.

It will be appreciated that up to and including this point in the present description, the machine has been operating in the play operation to record the incoming message over a previously traced circuit and has also recorded the received remote seizure signal, or tone, the purpose of which will be described later on in the operational description.

When ratchet relay 140 is operated momentarily, it closes its rewind contacts 141 and 144 and opens its play contacts 142 and 143 in the aforementioned manner. Therefore, when rewind contacts 141 close, a circuit is completed for extending power to the tape transport mechanism to operate the machine in the rewind operation. This circuit may be traced as extending from the fused side of the power source through contacts S2–1 of switch S2, conductor 1 into the tape transport mechanism 300, switch S13, conductor 5 from the tape transport mechanism, contacts 313, conductor 51, contacts 272, conductor 52, rewind contacts 141, conductor 53, down to conductor 8 into the tape transport mechanism to operate the machine in the rewind operation and back over conductor 2 to the return side of the power source.

As previously mentioned, when the contacts 271 of remote switching relay 260 closed, a circuit was completed for operating the audio seize relay 250. In actuating its contacts, audio seize relay 250 opens contacts 251 to disconnect the outgoing message playback head PU4 from the input conductor of preamplifier 430 of Board 3 in FIG. 4, closes contacts 252 to connect the incoming message record and play-back head PU2 to the input conductor of preamplifier 430, closes contacts 253 and opens contacts 254 to transfer the output of amplifier 431 of Board 3 from the level control resistance R23 to the level control resistance R22 of amplifier 432 of Board 3. Since the output of amplifier 432 is extended over a previously traced circuit to the telephone line, the audio play-back portion of the machine is in condition to play back the previously recorded incoming message over the telephone line to calling subscriber S.

The machine is now operating in the rewind operation as described, with the incoming message tape being rewound on the supply reel (FIG. 5) from the takeup reel until all of the incoming message tape has been rewound, at which time the transparent leader which is spliced onto the end of the incoming message tape is advanced to the point where light from lamp LA5 passes through the leader to the light sensitive cell LC–3, which is controlled in response thereto to pass current for operating rewind limit relay 310. This circuit for operating rewind limit relay 310 may be traced as extending from the fused side of the power source, contacts S2–1 of switch S2, the primary winding of transformer T–4, the upper secondary winding thereof and through rectifiers R*e*–4 and R*e*–5, light sensitive cell LC–3, resistance R24, winding of relay 310 and to the return side of the power source.

In actuating its contacts, rewind limit relay 310 performs no useful function at contacts 311 and 312 for the time being, opens contacts 313 to open the previously traced circuit for operating the tape transport mechanism in the rewind operation and closes contacts 314 to complete a circuit for momentarily reoperating ratchet relay 140. This reoperating circuit for ratchet relay 140 may be traced as extending from the fused side of the power source, contacts S2–1 of switch S, conductor 1 into the tape transport mechanism 300, switch S13, conductor 5 from the tape transport mechanism, contacts 314, conductor 59, rewind contacts 144, the winding of ratchet relay 140, rectifier R*e*–1, conductor 65, and to the return side of the power source.

In actuating its contacts, ratchet relay 140 opens is rewind contacts 141 and 144 and closes its play contacts 142 and 143, whereby a circuit is completed for extending power to the tape transport mechanism 300 to operate the machine in the play operation. This circuit may be traced as extending from the fused side of the power source through contacts S2–1 of switch S2, conductor 1 into the tape transport mechanism, switch S13, conductor 5 from the tape transport mechanism, contacts 314, conductor 59, play contacts 143, conductor 58, contacts 245, conductor 89, contact S5–3 of switch S5, contacts S6–1 of switch S6, contacts S7–3 of switch S7, conductor 10 into the tape transport mechanism to operate the machine in the play operation and back over conductor 2 to the return side of the power source.

The machine thus functions in the playback operation and will continue as such, with playback head PU2 extending the previously recorded incoming message to calling subscriber S over a circuit extending from playback head PU2, resistance R19, contact A engaged by the left-hand wiper in level S1–C, conductor 78, contacts 265, 252, conductor 25, cable C100, conductor 25, preamplifier 430 of Board 3 in FIG. 4, conductor 32, cable C100, conductor 32 to the left-hand wiper engaging contact A in level S1–D, conductor 33, cable C100, conductor 33, amplifier 431 of Board 3, conductor 35, cable C100, conductor 35, the right-hand wiper engaging contact A in level S1–C, conductor 81, contacts 234, condenser C10, contacts 253, conductor 24, cable C100, conductor 24, resistance R23, amplifier 432 of Board 3, conductor 20, cable C100, conductor 20, to the center tap of the right-hand winding of repeat coil RC–1 and from the left-hand winding of repeat coil RC–1 out over the telephone line to calling subscribers S. The machine continues in the playback operation to transmit the previously recorded incoming message out over the telephone line to calling subscriber S up to and including his previously recorded personal message, which was a forerunner to the application of the remote seizure tone. This recorded message serves as an indication that the machine has played back all of the recorded incoming messages. The recorded seizure signal thus provides a marker position on the incoming message tape for initiating the disconnect operation of the machine. Since this recorded segment of seizure tone, or marker, was the last recorded signal on the incoming message tape before the machine transferred to the remote playback operation, this marker tone therefore serves as the ideal point at which to disconnect the machine after all messages have been played back remotely. It will be appreciated that if the disconnect function of the machine was placed under control of the calling party, a condition of no disconnect could occur should the calling party accidentally be disconnected from the telephone line during the call-back operation. In this case the calling party could not reestablish a telephone connection to the machine because the machine would busy out its end of the telephone line, with the condition existing where the machine would tie up the telephone line for the entire time required to exhaust the tape from the supply reel, which could last for approximately an hour or two. To avoid these complications the remote seizure tone is recorded on the incoming message tape during the interval that the machine is still in the incoming record function and before it goes to the rewind and subsequent playback functions.

The operations of the machine as controlled by the recorded marker tone, after all of the messages have been played back to calling subscriber S, will hereafter be described.

The recorded marker tone is extended over a circuit from the incoming message play head PU2, resistance R19, contact A engaged by the left-hand wiper in level S1–C, conductor 78, contacts 265, 252, conductor 25, cable C100, preamplifier 430 of Board 3 in FIG. 4, conductor 32, cable C100, left-hand wiper engaged with contact A in level S1–D, conductor 33, cable C100, conductor 33 amplifier 431 of Board 3, conductor 35, cable C100, conductor 35, conductor 77, contacts 231, conductor 30, cable C100, conductor 30, amplifier 424 of Board 2, amplifier 425, conductor 16, cable C100, conductor 16, the left-hand winding of transformer T–3, the right-hand winding of transformer T–3, conductor 17, cable C100, conductor 17, resistance R25, rectifier R*e*–8, direct current amplifier 416 of Board 1, conductor 22, cable C100, conductor 22, the winding of disconnect relay 240, conductor 40, down through conductor 44, and to the output of direct current power from the rectifier bridge RB–2.

Before continuing with the operational description of disconnect relay 240, it will be appreciated that since the initiation of each remote seize function is started with the application of the remote seize signal to the telephone line and this seize signal is recorded on the tape as a marker tone, it is necessary that only the last marker tone at the end of all the recorded messages remain on the tape to initiate the remote playback and that this marker should be erased before the machine disconnects and returns to standby. It is obvious that if all recorded former marker tones were allowed to remain on the tape, the machine would disconnect upon reaching the first of these marker tones and as a result, messages recorded subsequent thereto could not be played back to the remote calling party. Therefore, in order to remove the marker tone after it has performed its disconnect function, it is necessary that the machine be operated in a momentary rewind, or back-space, and erase function to simultaneously erase the marker tone. The operation of disconnect relay 240 first performs the function of providing a momentary back-space and erase pulse to the playback mechanism, thereafter disconnects the machine from the telephone line and finally returns the machine to the automatic call-back standby condition.

In actuating its contacts, disconnect relay 240 closes contacts 241 to extend low voltage direct current to the incoming message erase head PU1 to serve as the erase potential, closes contacts 242 to prepare a point in the operating circuit of the rewind mechanism in the tape transport mechanism, opens contacts 243 to open the locking circuit of remote switching relay 260, closes contacts 244 to complete a circuit to the rewind mechanism in the tape transport mechanism to operate the machine in the momentary rewind operation and opens contacts 245 to open the circuit to the play-back mechanism to stop the machine from the play-back operation. Since the signal for operating disconnect relay 240 would cease as soon as this relay operated (because the operation of relay 240, as just described, switches the operation of the machine from play-back to rewind), it is necessary that disconnect relay 240 be maintained operated for a period of time necessary to allow the machine to momentarily rewind and erase the recorded marker tone. The means for maintaining disconnect relay 240 operated is the charged condenser C12, with this arrangement being described later on.

The circuit for providing the low voltage direct current erase potential to erase head PU1 may be traced as extending from the output of rectifier bridge RB–2, conductor 44, up over conductor 40, contacts 241, conductor 79, resistance R20, the left-hand wiper engaged with contact A in level S1–A and to the incoming message erase head PU1.

Remote switching relay 260 restores in response to its holding circuit being opened by disconnect relay 240 and completes an obvious circuit for allowing the previously charged condenser C12 to discharge through the winding of relay 240 to maintain this relay operated for a predetermined period of time, opens the playback message audio circuit, opens the locking circuit to the line load relay 210, opens the operating circuit to the audio seize relay 250, transfers control of the alternating current power circuits to the disconnect relay 240 and opens a point in the alternating current power circuit extended to the play mechanism in the tape transport mechanism.

The circuit for operating the machine in the momentary rewind function may be traced as extending from the fused side of the power source through contacts S2–1 of switch S2, conductor 1 into the tape transport mechanism 300, switch S13, conductor 5 from the tape transport mechanism, contacts S12–1 of the call back switch S12, conductor 47, contacts 242, conductor 62, play contact 142, conductor 57, contacts 288, 244, to the right over conductor 53, down over conductor 8 into the tape transport mechanism to operate the machine in the rewind operation and back over conductor 2 to the return side of the power source.

When audio seize relay 250 releases, all of the audio circuits are restored to normal, whereby the machine can subsequently operate in the aforedescribed functions to extend the recorded outgoing message to a calling party and thereafter record the incoming message.

As previously mentioned, disconnect relay 240 is maintained operated due to the charge on condenser C12, which in this case is of sufficient potential to hold the relay operated for approximately 2 seconds. It is therefore obvious that the machine will operate in the rewind-erase function for only this period of time to erase the marker tone. However, disconnect relay 240 will restore in response to the expiration of the above-mentioned holding time to open the circuit applying the low voltage direct current erase potential to the pickup head PU1, and also restores its contacts 242 through 245, inclusive, to open the circuits to the tape transport mechanism to stop the machine from the rewind function.

It will be appreciated, that upon the release of disconnect relay 240, the play contacts 142 and 143 of ratchet relay 140 are closed and start relay 120 is operated as previously described.

After condenser C15 has sufficiently discharged at the end of previously described 10 second time period, to no longer maintain line load relay 210 operated, relay 210 restores to discontinue supply of direct current power to the machine and disconnects the machine from the telephone line, all as previously described.

The machine is again in the standby condition and in readiness to perform another cycle of "Automatic Remote Call-Back" operation.

Certain specific features of the machine, and other special operating functions selected at the discretion of the remote calling subscriber, will now be described.

*Cancellation circuit of the remote seizure signal tone*

As previously mentioned, when the remote seizure signal was received at the machine, it was recorded on the incoming message tape to serve as a marker tone for the purpose of initiating the disconnect operation of the machine after the remote playback operation.

It will be appreciated that during the time that the machine is operating in the remote playback operation, this recorded marker tone, upon being played back, would cause a false operation of the seize tone relay 150 if it were not suppressed. Therefore, cancellation circuitry and apparatus is provided in the machine to eliminate false marker tone operation of the seize tone relay, with this apparatus functioning as described hereafter.

It is thought advisable to briefly review the operation of the seize tone relay 150, as was described when the remote seizure signal was applied to the telephone line from the remote station by calling subscriber S. As mentioned, direct current switch 412 of Board 1 is normally conducting and the signal therefrom is maintained near the positive ground potential by resistance R26 to keep the direct current amplifier 413 from conducting. This is the normal standby condition. When the remote seizure signal is applied to the telephone line and received over the previously described circuit, this signal is tuned and filtered before being applied to amplifier 410 of Board 1, this signal is then amplified by amplifier 410 and extended to amplifier 411 for further amplification, with the output therefrom being rectified by rectifier R*e*–7 and the positive component of the signal applied to direct current switch 412, which stops conducting in response to the positive signal. Since direct current switch 412 is no longer conducting, the input to direct current amplifier 413, and controlled by resistance R26, now becomes more negative and amplifier 413 begins conducting to operate the seize tone relay 150, which eventually causes the operation of remote switching relay 260, all as previously described.

It is further pointed out that in the normal standby condition, direct current switch 414 of Board 1 is normally conducting because of being under control of resistance R27, which allows the negative potential to be applied thereto, and as a result of direct current switch 414 being conductive, the emitter (not shown) ground return circuit of direct current amplifier 413 becomes a complete circuit, and amplifier 413 is thereby conditioned to where it may conduct.

The recorded remote seizure signal, or marker tone, is extended from the incoming message record and play head PU2 to preamplifier 430 of Board 3, where it is amplified and extended to amplifier 431 for further amplification. This signal is thereafter extended to and amplified by amplifier 424 of Board 2, with the output signal being tuned and filtered before being extended to amplifier 425 for additional amplification. The output from amplifier 425 is rectified by rectifier R*e*–6 and the positive component is applied to direct current switch 414 of Board 1, with this positive component stopping direct current switch 414 from conducting, which opens the above-mentioned emitter (not shown) ground return circuit of direct current amplifier 413 to prevent the amplifier 413 from conducting, thereby resulting in no operation of the seize tone relay 150. In this manner, the recorded remote seizure signal, or marker tone, is prevented from operating seize tone relay 150 to cause a false operation of the machine.

*Rewind and erase after remote call-back*

It will be appreciated that the purpose of this operation is to enable subscriber S, when calling remotely, to operate the machine in the rewind and erase operation and restore the full recording time capacity of the machine without the inconvenience of personally returning to the machine to operate the machine in the rewind and erase operation. In this manner, subscriber S may rewind the in message tape and erase the previously recorded incoming messages and thereby reset the machine's recording supply reel to the beginning portion of the tape from any remote telephone.

It is therefore assumed that the machine has first been operated in the "Automatic Remote Call-Back" operation, wherein all of the previously recording incoming messages have been played back to the remote calling subscriber S. At this point in the operation of the machine, remote subscriber S will hear his personal message that was recorded on the incoming message tape, before transmission of the remote seizure signal to the machine, followed by the recording of this seizure signal on the incoming message tape. As previously mentioned, the recording of this personal message served as an audible indication to calling subscriber S that he had called in to the machine at this particular location on the in message tape.

If remote calling subscriber S desires to erase all of the previously recorded incoming messages and reset the machine back to the maximum recording capacity, he must reoperate his portable pocket oscillator to reapply the remote seize tone signal to the telephone line immediately before the machine plays back the marker tone and goes into the momentary rewind and erase operation, which is thereafter followed by the disconnection of the machine from the telephone line.

The reapplied remote seizure signal is received in the machine over the previously described circuit, where it is amplified by amplifier 410 of Board 1 of FIG. 4, extended to amplifier 411 for further amplification and extended therefrom to the primary winding of transformer T–2, with the signal therefrom being extended from the secondary winding, rectified by rectifier R*e*–7 and applied to the direct current switch 412 of Board 1. As previously mentioned, direct current switch 412 is normally conducting, with its output being maintained at a particular potential to prevent conduction by the direct current amplifier 413. However when the above mentioned rectified signal is received by direct current switch 412, this signal is of such a potential as to stop further conduction thereof, thereby resulting in an increase in the potential applied to the direct current amplifier 413, which goes into conduction and operates the seize tone relay 150.

As described previously, the operation of seize tone relay 150 energized the 1400 cycle oscillator section of Board 2 in FIG. 4 to generate a signal for transmission over the telephone line to remote calling subscriber S as an indication that the answering machine has received and responded to the remote seizure tone.

At this point in the operational description, it is pointed out that the play contacts 142 and 143 of ratchet relay 140 are closed as mentioned, start relay 120 is operated, remote switching relay 260 is locked operated, line load relay 210 is locked operated and audio seize relay 250 is operated.

In the present function, remote calling subscriber S does not terminate the operation of his portable oscillator in response to hearing the 1400 cycle tone signal from the machine as he had done in the previous operation, but instead subscriber S maintains the operation of his oscillator until he no longer hears the 1400 cycle response tone from the machine, which in this case is an indication that his oscillator was operated for a sufficient length of time to cause the machine to go into the desired rewind and erase function as will hereafter be described.

Seize tone relay 150 operates in response to receipt of the reapplied remote seize tone signal and remains operated as long as the signal is received by the machine. As was previously described, when seize tone relay 150 closed contacts 151, low voltage direct current was extended to operate the 1400 cycle tone oscillator. In addition, the low voltage direct current is also extended from contacts 151 over conductor 14, cable C100, conductor 14, and resistance R28 to the direct current switch 417 of Board 1.

It is therefore assumed that the reapplied remote seize signal maintains seize tone relay 150 operated for a sufficient length of time, whereby the condenser C20, which is connected in shunt of the input and output of direct current switch 417, discharges over the above-traced low voltage direct current path, at this time direct current switch 417 becomes conductive for operating rewind erase timer relay 160.

The circuit for operating rewind erase timer relay 160 may be traced as extending from the output of direct current switch 417, conductor 21, cable C100, conductor 21, the winding of relay 160, temperature control resistor TR–2, to the left over conductor 44, and down to the output from the rectifier bridge RB–2.

In actuating its contacts 161, rewind erase timer relay 160 completes a circuit for energizing rewind erase relay 280, which may be traced as extending from the fused side of the power source, contacts S2–1 of switch S2, conductor 1 into the tape transport mechanism 300, switch S13, out over conductor 5 from the tape transport mechanism, contacts 313, conductor 51, contacts 161, conductor 45, the winding of rewind erase relay 280, conductor 49, rectifier R*e*–1, conductor 65, and to the return side of the power source.

In actuating its contacts, rewind erase relay 280 closes contacts 281 for extending low voltage direct current to the incoming message erase head PU1 to provide erase potential thereto, opens contacts 282 to remove condenser C12 from being connected in shunt of the winding of disconnect relay 240, closes contacts 283 to complete an obvious circuit for discharging condenser C12 to the low voltage direct current supply, opens contacts 284 to remove the low voltage direct current supply from the 1400 cycle oscillator section of Board 2, opens contacts 285 to transfer control of the locking circuits of remote switching relay 260 and itself to the rewind limit relay 310, closes contacts 286 to complete its own above-mentioned locking circuit, closes contacts 287 for completing a circuit to operate the machine in the rewind function and at contacts 288 opens the circuit to stop operation of the machine in the play function.

The circuit for extending the direct current erase potential to the incoming message erase head PU1 may be traced as extending from the output of the rectifier bridge RB–2, conductor 44, up and to the right over conductor 40, contacts 281, conductor 79, the left-hand wiper engaged with contact A in the level S1–A and to the incoming message erase head PU1.

The opening of the low voltage direct current supply circuit to the 1400 cycle oscillator section of Board 2 causes the 1400 cycle oscillator to terminate the transmission of the 1400 cycle recognition tone, which is an audible indication to calling subscriber S that the machine has responded and switched to the rewind and erase function.

The locking circuit for rewind erase relay 280 may be traced as extending from the fused side of the power source through contacts S2–1 of switch S2, conductor 1 into the tape transport mechanism 300, switch S13, over conductor 5 from the tape transport mechanism, contacts S12–1 of the switch S12, conductor 47, contacts 243, conductor 83, contacts 312, conductor 82, contacts 286, the winding of rewind erase relay 280, conductor 49, rectifier *Re*–1, conductor 65, and to the return side of the power source.

The circuit for operating the machine in the rewind function may be traced as extending from the fused side of the power source through contacts S2–1 of switch S2, conductor 1 into the tape transport mechanism 300, switch S13, over conductor 5 from the tape transport mechanism, contacts 313, conductor 51, contacts 272, conductor 52, play contacts 142, conductor 57, contacts 287, conductor 53, down to conductor 8 into the tape transport mechanism to operate the machine in the rewind function and back over conductor 2 to the return side of the power source.

Remote calling subscriber S terminates the operation of his portable oscillator subsequent to the disappearance of the 1400 cycle tone, thereby removing the reapplication of the remote seizure signal from the telephone line. Seize tone relay 150 thereby restores, since no remote seizure signal is received, and at contacts 153 completes a previously described circuit for momentarily operating pulse relay 130 from the charge on condenser C5.

Pulse relay 130 momentarily closes contacts 132 to complete a previously traced circuit for momentarily operating ratchet relay 140, which opens play contacts 142 and 143 and closes rewind contacts 141 and 144 in the aforedescribed manner. The opening of the play contacts and the closing of the rewind contacts of ratchet relay 140 does not at this time change the operating function of the machine, but only provides a new circuit path for continuing to operate the tape transport mechanism in the rewind function. This new circuit path may be traced as extending from the fused side of the power source through contacts S2–1 of switch S2, conductor 1 into the tape transport mechanism 300, switch S13, over conductor 5 from the tape transport mechanism, contacts 313, conductor 51, contacts 272, conductor 52, contacts 141, conductor 53, down to conductor 8 into the tape transport mechanism to operate it in the rewind function and back over conductor 2 to the return side of the power source.

At this point in the operational description, it will be noted that the machine has switched to and is operating in the rewind and erase function and that calling subscriber S no longer has remote control of the functions of the machine, since additionally received remote seize tone signals will result in the operation of seize tone relay 150, which will momentarily operate the pulse relay 130 to momentarily operate ratchet relay 140. However, operation of the play and rewind contacts of relay 140 result in no further control of the operations of the tape transport mechanism until the machine has completed the present rewind and erase function. Therefore, the machine operates in the rewind and erase function to rewind the in message tape and erase all of the messages previously recorded thereon up to the point that the previously described transparent leader appears, which indicates that all of the incoming message tape has been rewound onto the supply reel. At this time, as previously described, light from lamp LA5 passes through the transparent leader to cause the light sensitive cell LS–3 to pass current, which causes the operation of rewind limit relay 310.

In actuating its contacts, rewind limit relay 310 closes contacts 311 to extend a ground potential over an obvious circuit for discharging condenser C5 thereover in the event seize tone relay 150 is subsequently operated, thus preventing the operation of pulse relay 130, opens contacts 312 to open the previously described locking circuits of rewind switching relay 260 and rewind erase relay 280, opens contacts 313 to open the previously traced energizing circuit for operating the tape transport mechanism in the rewind operation and closes contacts 314 for energizing ratchet relay 140 as previously described.

Ratchet relay 140 operates and opens its rewind contacts 141 and 144 and closes its play contacts 142 and 143 with power being extended by way of rewind limit contacts 314 and the play contacts of ratchet relay 140 for thereafter operating the tape transport mechanism in the play function.

The tape transport mechanism operates the machine in the play function to advance the in message tape from the supply reel to the takeup reel to the point where the transparent leader is no longer between lamp LA5 and light sensitive cell LC–3, at which time, light sensitive cell LC–3 no longer passes current and rewind limit relay 310 restores.

During the time that the machine has operated in the play function to remove the transparent leader from between lamp LA–5 and light sensitive cell LC–3, remote switching relay 260 and erase relay 280 have restored. Remote switching relay 260 thereby opens the operating circuit for restoring audio seize relay 250 and further opens the holding circuit to the line load relay 210.

Line load relay 210 restores subsequent to condenser C15 discharging through its windings and operates as previously described to disconnect the machine from the calling telephone line.

The machine has thus completed an entire cycle of "Automatic Remote Call-Back" operation and is now in the standby condition and in readiness for other selected functional operations.

Having described my invention and what is considered new and is desired to have protected by Letters Patent will be pointed out in the appended claims.

What is claimed is:

1. An automatic telephone answering and message recording machine for delivering a prerecorded outgoing announcement from an endless magnetic tape and recording incoming messages on a large capacity magnetic storage tape in response to receipt of ringing current received over a telephone line, connected in multiple to said machine and a local unattended subscriber station, on incoming calls to said local station from remote calling subscribers, comprising: a ringal signal responding relay in said machine directly operated in response to receipt of said ringing current over said line during a call to said local subscriber station by one of said calling subscrbires; tape moving means controlled in response to said operation of said ring signal relay for initiating the movement of said endless tape in a cycle of operation; means in said machine for transmitting said prerecorded announcement over said line to said one calling subscriber during said cycle of operation of said endless tape; other moving means including means controlled by said endless tape in response to the termination of said prerecorded message for moving said storage tape in a normal direction; means for recording an incoming message received over said line from said one calling subscriber on said storage tape during said movement thereof in said normal direction; signal generating means; means controlled by said endless tape at a particular point in said cycle of operation for operating said signal generating means to transmit an incoming message termination signal over said line to said one calling subscriber; a start stop relay; means controlled by said endless tape at a different point in said cycle of operation for operating said start stop relay; means operated by said start stop relay for terminating said cycle of operation of said endless tape; delaying means rendered effective in response to said operation of said start stop relay for maintaining said other moving means operative to move said storage tape in said normal direction for a predetermined period of time after said termination of said cycle of operation of said endless tape; a seize time relay; means controlled by said start stop relay only during the time said delaying means is effective for operating said seize time relay; means operated by said one calling subscriber subsequent to receipt of said termination signal and during said predetermined time for transmitting a remote seizure signal over said line to said machine to initiate seizure and subsequent predetermined functions thereof; and means controlled by said seize time relay for conditioning said machine to receive said remote seizure signal only during said predetermined time that said normal direction of movement of said storage tape is maintained.

2. An automatic telephone answering and message recording machine for delivering a prerecorded outgoing announcement from an endless magnetic tape and recording incoming messages on a large capacity magnetic storage tape in response to receipt of ringing current received over a telephone line, connected in multiple to said machine and a local unattended subscriber station, on incoming calls to said local station from remote calling subscribers, comprising: a ring signal responding relay in said machine directly operated in response to receipt of said ringing current over said line during a call to said local subscriber station by one of said calling subscribers; tape moving means controlled in response to said operation of said ring signal relay for initiating the movement of said endless tape in a cycle of operation; means in said machine for transmitting said prerecorded announcement over said line to said one calling subscriber during said cycle of operation of said endless tape; other moving means including means controlled by said endless tape in response to the termination of said prerecorded message for moving said storage tape in a normal direction; means for recording an incoming message received over said line from said one calling subscriber on said storage tape during said movement thereof in said normal direction; signal generating means; means controlled by said endless tape at a particular point in said cycle of operation for operating said signal generating means to transmit an incoming message termination signal over said line to said one calling subscriber; a start stop relay; means controlled by said endless tape at a different point in said cycle of operation for operating said start stop relay; means operated by said start stop relay for terminating said cycle of operation of said endless tape; delaying means rendered effective in response to said operation of said start stop relay for maintaining said other moving means operative to move said storage tape in said normal direction for a predetermined period of time after said termination of said cycle of operation of said endless tape; a seize time relay; means controlled by said start stop relay only during the time said delaying means is effective for operating said seize time relay; means operated by said one calling subscriber subsequent to receipt of said termination signal and during said predetermined time for transmitting a remote seizure signal over said line to said machine to initiate seizure and subsequent predetermined operations thereof; means controlled by said seize time relay for conditioning said machine to receive said remote seizure signal only during said predetermined period of time that said normal direction of movement of said storage tape is maintained; and means controlled by said delaying means during said predetermined time for maintaining said recording means operative to record said received remote seizure signal on said storage tape as an indication of the last recording thereon and for marking the position of maximum advance thereof during said movement in said normal direction.

3. An automatic telephone answering and message recording machine for delivering a prerecorded outgoing announcement from an endless magnetic tape and recording incoming messages on a large capacity magnetic storage tape in response to receipt of ringing current over a telephone line, connected in multiple to said machine and a local unattended subscriber station, on incoming calls to said local station from remote calling subscribers, comprising: a ring signal responding relay in said machine directly operated in response to receipt of said ringing current over said line during a call to said local subscriber station by one of said calling subscribers; tape moving means controlled in response to said operation of said ring signal relay for initiating the movement of said endless tape in a cycle of operation; means in said machine for transmitting said prerecorded announcement over said line to said one calling subscriber during said cycle of operation of said endless tape; other moving means including means controlled by said endless tape in response to the termination of said prerecorded message for moving said storage tape in a normal direction; means for recording an incoming message received over said line from said one calling subscriber on said storage tape during said movement thereof in said normal direction; signal generating means; means controlled by said endless tape at a particular point in said cycle of operation for operating said signal generating means to transmit an incoming message termination signal over said line to said one calling subscriber; a start stop relay; means controlled by said endless tape at a different point in said cycle of operation for operating said start stop relay; means operated by said start stop relay for terminating said cycle of operation of said endless tape; delaying means rendered effective in response to said operation of said start stop relay for maintaining said other moving means operative to move said storage tape in said normal direction for a predetermined period of time after said termination of said cycle of operation of said endless tape; a seize time relay; means controlled by said start stop relay only during the time said delaying means is effective for operating said seize time relay; means operated by said one calling subscriber subsequent to receipt of said termination signal and during said predetermined time for transmitting a remote seizure signal over said line to said machine to initiate seizure and subsequent predetermined functions thereof; means controlled by said seize time relay for conditioning said machine to receive said remote seizure signal only during said predetermined time that said normal direction of movement of said storage tape is maintained; means controlled by said delaying means during said predetermined period of time for maintaining said recording means operative to record said received remote seizure signal on said storage tape as an indication of the last recording thereon and for marking the position of maximum advance thereof during said movement in said normal direction; a seize tone relay; remote signal responding means in said machine operated in response to receipt of said remote seizure signal for operating said seize tone relay; a remote switching relay; means operated in response to said operation of said seize tone relay for operating said remote switching relay; means operated by said remote switching relay for preparing said machine to operate in subsequent predetermined functions; and additional means operated in response to said operation of said seize tone relay for reoperating said signal generating means to transmit an acknowledgement signal over said line to indicate to said one calling subscriber that said machine has received and responded to said remote seizure signal.

4. A machine in accordance with claim 3, wherein said remote signal responding means ceases operation in response to the termination of said transmission of said remote seizure signal by said one calling subscriber for restoring said seize tone relay; and including movement switching means having a normal position and a rewind position; means operated in response to said restoration of said seize tone relay for operating said movement switching means from said normal position to said rewind position; said other moving means disabled in response to said operation of said movement switching means from said normal position for discontinuing movement of said storage tape in said normal direction; and reversing means operated in response to said operation of said movement switching means to said rewind position for moving said storage tape in a rewind direction.

5. A machine in accordance with claim 4, including rewind limit means; a transparent segment attached to the end of said storage tape preceding the recordable portion; means controlled by said segment in response to the movement of said storage tape to a maximum position in said rewind direction for operating rewind limit means; means operated in response to said operation of said rewind limit means for reoperating said movement switching means from said rewind position to said normal position; said reversing disabled in response to said reoperation of said movement switching means from said rewind position for discontinuing movement of said storage tape in said rewind direction; said other moving means reoperated in response to said reoperation of said movement switching means to said normal position for moving said storage tape a second time in said normal direction; said rewind limit means restored in response to second time movement of said storage tape in said normal direction away from said normal position; and means operated in response to said restoration of said rewind limit means for playing back all previously recorded incoming messages from other calling subscribers over said line to said one calling subscriber during said second time movement of said storage tape in said normal direction.

6. A machine in accordance with claim 5, including a disconnect relay in said machine; said last mentioned means also playing back said recorded remote seizure signal; means in said machine operated in response to receipt of said played back remote seizure signal for operating said disconnect relay; and means operated in response to said operation of said disconnect means for terminating operation of said other moving means; whereby said second time movement of said storage tape in said normal direction is discontinued.

7. A machine in accordance with claim 6, including means operated in response to said operation of said disconnect relay for restoring said operated remote switching relay; means rendered effective in response to said restoration of said remote switching relay for maintaining said disconnect relay operated for a predetermined period of time; said reversing means reoperated in response to said operation of said disconnect relay for moving said storage tape a second time in said rewind direction only during said predetermined period of time said disconnect means is maintained operated; and means controlled by said operation of said disconnect relay for erasing said remote recorded remote seizure signal, simultaneous with said second time movement of said storage tape in said rewind direction.

8. A machine in accordance with claim 7, wherein said disconnect relay restores in response to said expiration of said predetermined period of time, and including means controlled in response to said restoration of said disconnect relay for restoring said machine to a normal standby condition.

9. A machine in accordance with claim 5, wherein said means for transmitting said remote seizure signal is reoperated by said calling subscriber for a definite period of time immediately subsequent to said playing back of the last one of said recorded incoming messages for repeating the transmission of said remote seizure signal corresponding in duration to said definite period of time over said line to said machine; said remote signal responding means reoperated in response to receipt of said repeated remote seizure signal for reoperating said seize tone relay only during said definite period of time; a timing relay; means controlled by said reoperation of said seized tone relay for operating said timing relay; a rewind-erase relay; means operated in response to said operation of said timing relay for operating said rewind-erase relay; means operated in response to said operation of said rewind-erase relay for discontinuing said reoperation of said other moving means to stop said second time movement of said storage tape in said normal direction; means operated in response to said operation of said rewind-erase relay for reoperating said reversing means to move said storage tape a second time in said rewind direction to said maximum rewind position; erasing means; and means operated in response to said operation of said rewind-erase relay for operating said erasing means during said second time movement of said storage tape in said rewind direction to erase all incoming messages recorded thereon.

10. A machine in accordance with claim 9, wherein said signal generating means is reoperated in response to said reoperation of said seized tone relay for retransmitting said acknowledgement signal over said line to said one calling subscriber as an indication that said machine has received said repeated remote seizure signal; and including means operated in response to said operation of said rewind-erase relay for disabling said signal generating means to discontinue said retransmission of said acknowledgement signal as an indication to said one calling subscriber that said machine has responded to said receipt of said repeated remote seizure signal; wherein said storage tape is moved said second time in said rewind direction simultaneous with said erasure of all said recorded messages therefrom.

References Cited

UNITED STATES PATENTS

| | | | |
|---|---|---|---|
| 2,928,898 | 3/1960 | Salzberg et al. | 179—6 |
| 3,067,289 | 12/1962 | Zimmermann | 179—6 |
| 3,127,474 | 3/1964 | Waldman | 179—6 |

BERNARD KONICK, *Primary Examiner.*

P. SPERBER, *Assistant Examiner.*